(12) United States Patent
Matsuyuki et al.

(10) Patent No.: US 10,482,305 B1
(45) Date of Patent: Nov. 19, 2019

(54) ELECTRONIC DEVICES WITH THIN-FILM MASKING LAYERS

(71) Applicant: Apple Inc., Cupertino, CA (US)

(72) Inventors: Naoto Matsuyuki, Tokyo (JP); Matthew S. Rogers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 15/170,818

(22) Filed: Jun. 1, 2016

Related U.S. Application Data

(60) Provisional application No. 62/275,564, filed on Jan. 6, 2016.

(51) Int. Cl.
*G06K 9/00* (2006.01)

(52) U.S. Cl.
CPC .................. *G06K 9/0002* (2013.01)

(58) Field of Classification Search
CPC ............ H01L 27/323; H01L 27/3246; H01L 51/5203; H01L 51/5237; G06K 9/00053; G06K 9/0002; G06K 9/0008; G06K 3/0412
See application file for complete search history.

(56) References Cited

U.S. PATENT DOCUMENTS

| | | | |
|---|---|---|---|
| 6,174,745 B1 | 1/2001 | Szydlo et al. | |
| 8,427,043 B2 | 4/2013 | Tchakarov et al. | |
| 8,492,270 B2 | 7/2013 | Ponoth et al. | |
| 8,525,405 B2 * | 9/2013 | Kuwabara | G02F 1/1333 313/498 |
| 9,297,675 B2 | 3/2016 | Keranen et al. | |
| 9,939,978 B2 * | 4/2018 | Chen | G06F 1/1601 |
| 2014/0075750 A1 * | 3/2014 | Choi | G06F 3/041 29/831 |
| 2014/0145181 A1 * | 5/2014 | Yamazaki | H02H 9/044 257/43 |
| 2015/0062709 A1 * | 3/2015 | Matsuyuki | C03C 17/3417 359/584 |
| 2016/0149133 A1 | 5/2016 | Kim et al. | |

* cited by examiner

*Primary Examiner* — Seahvosh Nikmanesh
(74) *Attorney, Agent, or Firm* — Treyz Law Group, P.C.; G. Victor Treyz; David K. Cole

(57) ABSTRACT

An electronic device may have transparent structures. The transparent structures may include a transparent member such as a transparent button member. The transparent member may have an inner surface that is covered with an opaque masking layer. The opaque masking layer may be white and may include a white porous inorganic layer covered with an opaque layer that increases the optical density of the opaque masking layer. The white porous inorganic layer may be formed by depositing a metal or other material using physical vapor deposition followed by an annealing process in the presence of oxygen. The opaque layer may be an optically dense inorganic layer such as a metal oxide layer. The button member may be located within an opening in a display cover layer. A fingerprint sensor may be attached to the opaque layer on the button member.

14 Claims, 4 Drawing Sheets

ELECTRONIC DEVICES WITH THIN-FILM MASKING LAYERS

This application claims the benefit of provisional patent application No. 62/275,564 filed on Jan. 6, 2016, which is hereby incorporated by reference herein in its entirety.

FIELD

This relates generally to electronic devices and, more particularly, to masking layers for coating transparent structures in electronic devices.

BACKGROUND

Electronic devices sometimes contain transparent structures. For example, the display in a cellular telephone may be covered with a layer of glass. Cosmetic coatings such as masking layers of black and white ink are sometimes formed on the inner surfaces of the glass layer. In some devices, transparent button members may be coated with ink layers.

If care is not taken, the masking material that is used to coat a transparent structure in an electronic device may be prone to discoloration. For example, white ink layers that contain titanium oxide particles may acquire a bluish tint upon exposure to ultraviolet light.

SUMMARY

An electronic device may have transparent structures. The transparent structures may include a transparent member such as a transparent button member. The electronic device may have a display with a display cover layer. The transparent button member may be located in an opening in the display cover layer.

The transparent member may have an inner surface that is covered with an opaque masking layer. The opaque masking layer may be white. The opaque masking layer may be formed from inorganic layers. The inorganic layers may be deposited using physical vapor deposition and other fabrication techniques.

The opaque masking layer may include a white porous inorganic layer. The opaque masking layer may also have an opaque layer that covers the white porous inorganic layer to increase the optical density of the opaque masking layer.

The white porous inorganic layer may be formed by depositing a solid layer of metal or other material using physical vapor deposition followed by an annealing process in the presence of oxygen to form a porous layer that scatters light. The opaque layer may be an optically dense inorganic layer such as a metal oxide layer.

A sensor may be coupled to the transparent member. For example, a fingerprint sensor may be attached to the opaque layer on a transparent button member using a layer of adhesive.

DETAILED DESCRIPTION

Electronic devices may be provided with opaque layers of material. The opaque layers of material, which may sometimes be referred to as opaque masking layers, masking layers, or masking structures may be white, black, gray, or may have other suitable colors. Configurations in which the opaque layers are white may sometimes be described herein as an example. This is, however, merely illustrative. Coatings for electronic devices may have any suitable appearance.

Figure 1:
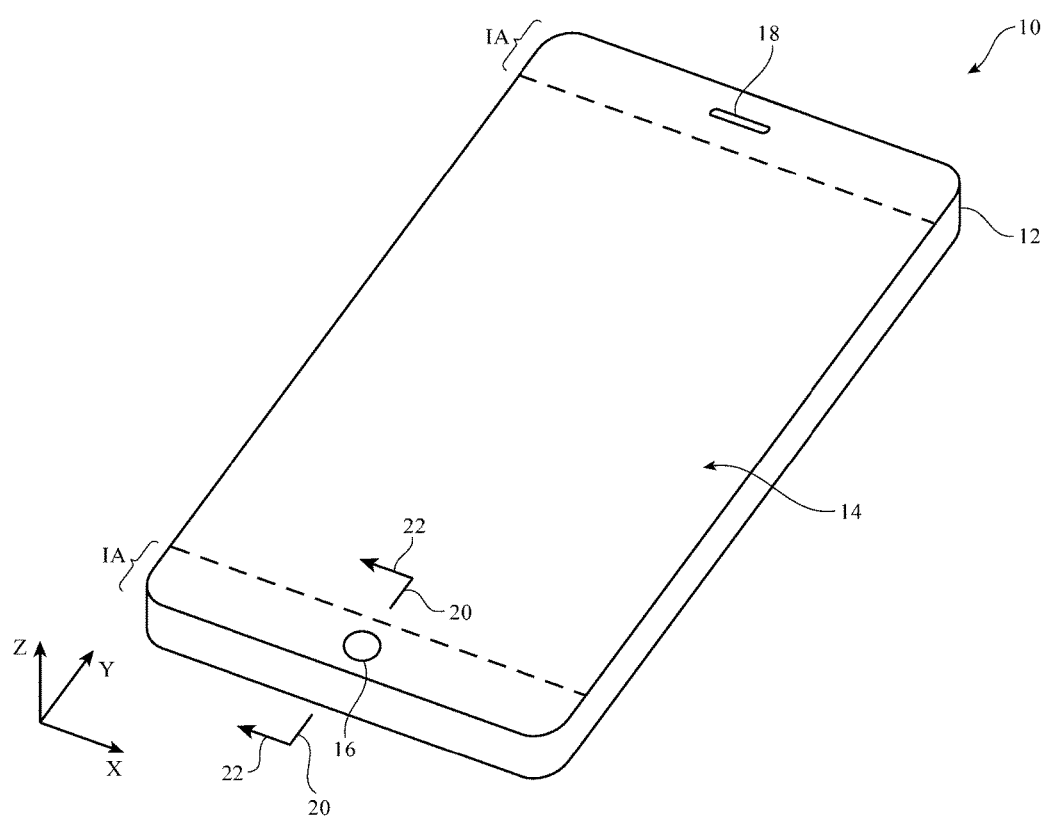
FIG. 1 is a perspective view of an illustrative electronic device in accordance with an embodiment.

FIG. 1 is a perspective view of an illustrative electronic device of the type that may include an opaque masking layer. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes display 14. Display 14 has been mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Openings may be formed in housing 12 to form communications ports, holes for buttons, and other structures.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 14 may include an array of pixels formed from liquid crystal display (LCD) components, an array of electrophoretic pixels, an array of plasma display pixels, an array of organic light-emitting diode pixels or other light-emitting diode pixels, an array of electrowetting pixels, or pixels based on other display technologies.

Display 14 may be protected using a display cover layer such as a layer of transparent glass, clear plastic, transparent ceramic, sapphire or other transparent crystalline material, or other transparent layer(s). The display cover layer may have a planar shape, a convex curved profile, a concave curved profile, a shape with planar and curved portions, a layout that includes a planar main area surrounded on one or more edges with a portion that is bent out of the plane of the planar main area, or other suitable shape. An opening may be formed in the display cover layer to accommodate ports such as speaker port 18.

One or more additional openings may also be formed in the display cover layer. For example, an opening may be formed in the display cover layer to accommodate a button such as button 16. Button 16 may be formed from a transparent button member that moves within the opening in the display cover layer. The button member may be circular, may be square, or may have other suitable shapes and may be formed from the same material as the display cover layer or other suitable materials. With one illustrative arrangement, which may sometimes be described herein as an example, button 16 may have a button member formed from a transparent layer such as a layer of sapphire. An opaque masking layer may be formed on the underside of the button member and on portions of the display cover layer for display 14 (e.g., on the inner surface of the display cover layer in inactive area IA of display 14). Other configurations may be used for display 14, if desired (e.g., button 16 may be formed from an integral region of the display cover layer, etc.).

Figure 2:
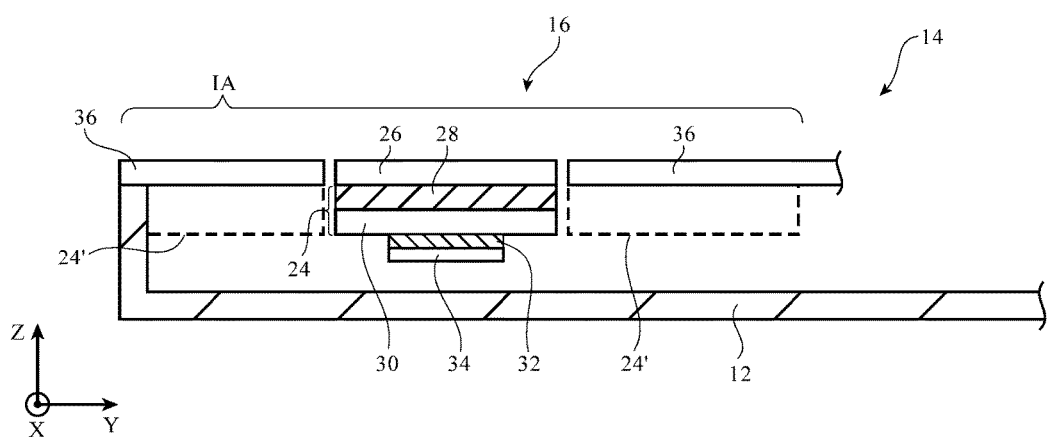
FIG. 2 is a cross-sectional side view of a portion of an illustrative electronic device with a button member in accordance with an embodiment.

FIG. 2 is a cross-sectional side view of a portion of device 10 of FIG. 1 in the vicinity of button 16 taken along line 20 of FIG. 1 and viewed in direction 22. As shown in FIG. 2, opaque masking structures such as opaque masking layer 24 may be formed on the underside of button member 26 in button 16 and on the underside of display cover layer 36 (e.g., in the portions of display cover layer 36 shown by opaque masking structures 24' of FIG. 2 and inactive area IA of FIG. 1). The opaque masking structures on button member 26 may be the same as the opaque masking structures in regions 24' on the underside of display cover layer 36 or the masking structures in region 24' may be formed from using a first configuration (e.g., an opaque ink layer) and the structures under button member 26 may be formed using a second configuration (e.g., inorganic layers formed using techniques such as physical vapor deposition layer).

Button member 26 may be transparent. Opaque masking layer 24 may block visible light. For example, opaque masking layer 24 may be a white layer that blocks internal components under member 26 from view. Layer 24 may be opaque or transparent at infrared wavelengths. Configurations for device 10 in which layer 24 is formed under a transparent member such as button member 26 may sometimes be described herein as an example. In general, masking layer 24 may be formed on the surface of any suitable structure in device 10.

Button member 26 may be formed from a transparent structure such as a layer of sapphire, glass, or plastic (as examples). During operation, a user may press against button member 26, causing button member 26 to move in the −Z direction (e.g., to actuate a tactile switch or other device under button member 26). To provide button 16 with the ability to gather user fingerprints, button 16 may have a sensor such as fingerprint sensor 34. Fingerprint sensor 34 may, for example, be a capacitive sensor (i.e., a capacitive touch sensor) that has an array of capacitive touch sensor electrodes. Sensor 34 may be formed from a semiconductor die (e.g., a silicon integrated circuit) and may be coupled to control circuitry within device 10 using a flexible printed circuit cable or other signal path.

Sensor 34 may be mounted to the inner surface of opaque masking structures 24 using adhesive 32. Adhesive 32 may be a rigid adhesive such as a cured liquid adhesive (e.g., epoxy, a silicone-epoxy hybrid with a high cross-link density, etc.), may be a layer of pressure sensitive adhesive, or may be other suitable adhesive. If desired, button 16 may be formed from an integral portion of the display cover layer for display 14 and/or may have a strain gauge or other sensor for detecting when a user has pressed on button 16. The use of a configuration for button 16 with a movable button member and an associated tactile switch is merely illustrative.

Opaque masking structures 24 may include layers such as layers 28 and 30. Layers 28 and 30 may be formed as coating layers on the inner surface of button member 26 (and the inner surface of display cover layer 36 and/or other transparent structures in device 10). Layer 28 may be a light-scattering layer such as a white layer. The white layer may be formed by depositing a layer of metal, metal oxide, or other solid material using physical vapor deposition or other suitable deposition techniques and creating a translucent porous light-scattering layer from the deposited solid layer by annealing the deposited layer. Layer 30 may be an opaque layer such as a grayish or whitish layer of zinc oxide or other material with a thickness of 0.5 to 5 microns, 1-3 microns, or other suitable that ensures that a desired optical density (opacity) for layer 30 and therefore structures 24 is achieved.

Figure 3:
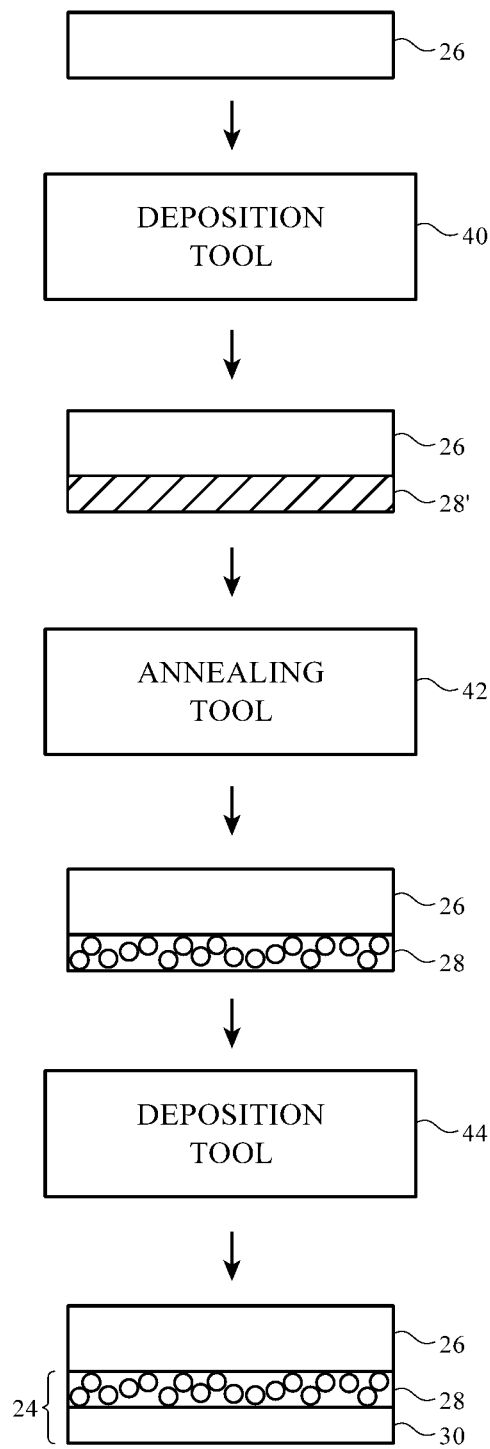
FIG. 3 is a diagram showing equipment and operations involved in forming an opaque masking layer on the underside of a transparent structure such as a button member in accordance with an embodiment.

FIG. 3 is a diagram showing how opaque masking structures 24 may be formed on the underside of a transparent structure such as button member 26.

As shown in FIG. 3, deposition tool 40 may deposit a layer of material (layer 28') on the underside of button member 26. Deposition tool 40 may be a physical vapor deposition tool such as a sputtering tool or evaporation system. Layer 28' may be a metal such as titanium, zirconium, zinc, or other metal, may be a metal oxide such as zirconium oxide or other metal oxide, or may be any other suitable layer of material that can be processed to form layer 28 of structures 24. Layer 28' may have a thickness of 2-5 microns, 1-10 microns, more than 0.5 microns, more than 2 microns, less than 20 microns, less than 10 microns, less than 6 microns, less than 4 microns, or other suitable thickness.

Following deposition of layer 28', layer 28' can be annealed using annealing tool 42. Annealing tool 42 may have a heated chamber or other equipment for raising the temperature of member 26 and layer 28' to an elevated temperature in the presence of a desired gaseous environment. As an example, annealing tool 42 may be used to anneal layer 28' at a temperature of 800-1200° C., 900-1000° C., less than 1250° C., more than 700° C., or other suitable temperature for 1-60 minutes, fewer than 10 minutes, or more than 5 minutes, or other suitable duration. Annealing may be performed in air (which contains oxygen), oxygen, or other gaseous environments containing oxygen or other suitable reactant for reacting with layer 28'.

The annealing process transforms layer 28' (e.g., a solid layer) to light-scattering layer 28 (e.g., a porous layer created by oxidizing layer 28'). During annealing of titanium, for example, titanium dioxide crystallization may create a porous titanium oxide layer in which pores within the layer serve as light scattering centers. The scattering of light in light-scattering layer 28 creates a desired color for structures 24 (e.g., white). The porous nature of the titanium dioxide in layer 28 may also allow atmospheric oxygen to penetrate into layer 28 when structures 24 are being used in a completed device. In the absence of atmospheric oxygen, the titanium dioxide in layer 28 might turn bluish upon exposure to ultraviolet light (e.g., due to the formation of $Ti^{3+}$ ions). When oxygen is able to penetrate into layer 28 through the pores of layer 28, layer 28 will remain white.

Layer 28 may have a thickness of 25 microns, 10-30 microns, less than 25 microns, less than 15 microns, less than 10 microns, 2-5 microns, 1-10 microns, more than 0.5 microns, more than 2 microns, less than 20 microns, less than 6 microns, less than 4 microns, or other suitable thickness. Physical vapor deposition layers (before and after annealing) may be smoother than layers of printed ink and other opaque masking layers. By using a relatively thin and smooth layers in forming structures 24 (e.g., physical vapor deposition layers), operation of capacitive fingerprint sensor 34 (FIG. 2) may be enhanced (e.g., noise may be reduced). Adhesion (e.g., adhesion by adhesive 32) may also be enhanced by forming structures 24 using physical vapor deposition.

Although layer 28 may have a desired appearance (e.g., white), layer 28 may be less opaque than desired. For example, layer 28 may have a translucent milky white appearance. To ensure that opaque masking structures 24 have a desired optical density, one or more additional layers of material may be used to coat layer 28. For example, an additional layer of material such as layer 30 may be deposited on layer 28 using deposition tool 44 (e.g., a physical vapor deposition tool such as a sputtering tool or evaporation system). Layer 30, may have a thickness of 1-3 microns, 2-5 microns, 1-10 microns, more than 0.5 microns, more than 1 micron, more than 2 microns, less than 3 microns, less than 5 microns, less than 10 microns, less than 6 microns, less than 4 microns, or other suitable thickness. Examples of materials that may be used for layer 30 include inorganic materials such as zirconium oxide (e.g., sputtered zirconium oxide) and other metal oxides.

Figure 4:
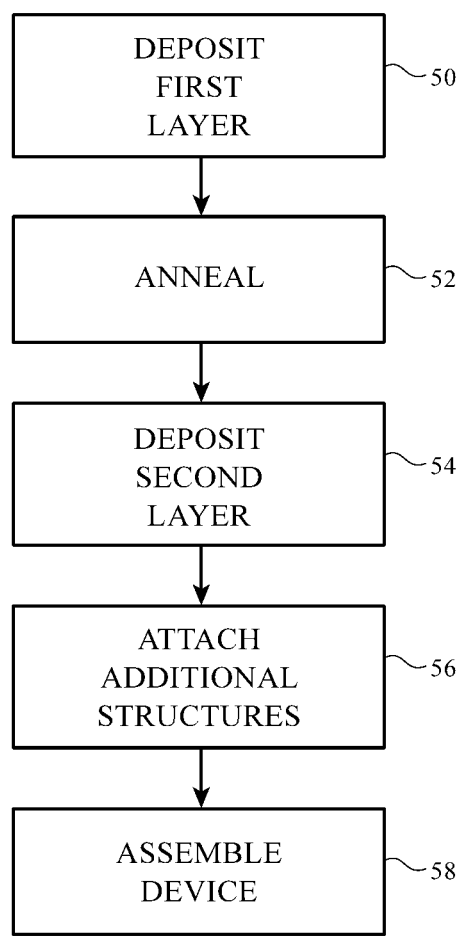
FIG. 4 is a flow chart of illustrative operations involved in forming electronic devices with opaque masking layers on transparent members in accordance with an embodiment.

FIG. 4 is a flow chart of illustrative steps involved in forming an electronic device with opaque masking structures 24.

At step 50, layer 28' may be deposited on a structure such as button member 26. For example, a layer of titanium, zirconium, zirconium oxide, zinc, other metals or metal oxides, or other materials may be deposited in a thin-film layer using deposition tool 40 (e.g., a physical vapor deposition tool). Layer 28' may be a solid layer of inorganic material.

At step 52, annealing tool 42 may be used to transform layer 28' into a porous layer. Tool 42 may, for example, anneal layer 28' in an environment containing oxygen, thereby oxidizing layer 28' to create a layer (layer 28) that is porous. Porous layer 28 has light scattering centers (e.g., pores) that help scatter light and make layer 28 appear white (or other suitable color).

At step 54, optical density can be enhanced by depositing a second layer of material such as layer 30 on layer 28. Layer 30 may have a whitish or grayish appearance (as an example) and may be able to effectively block visible light even when layer 30 is thin (e.g., less than 25 microns, less than 5 microns, etc.). Layer 30 may be an inorganic layer or an organic layer. The use of a thin inorganic layer for layer 30 may help enhance fingerprint sensor performance.

Adhesive 32 may be used to attach fingerprint sensor 34 or other devices to opaque masking structures 24 (e.g., layer 28 and layer 30) at step 56. Button member 26 and other structures may then be assembled to form device 10 (step 58).

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a transparent member; and
   opaque masking structures on the transparent member that contain a porous inorganic layer, wherein the porous inorganic layer is in direct contact with the transparent member.

2. The electronic device defined in claim 1 wherein the porous inorganic layer comprises a white layer.

3. The electronic device defined in claim 1 wherein the porous inorganic layer comprises a white layer deposited by physical vapor deposition and annealed to oxidize the porous inorganic layer.

4. The electronic device defined in claim 3 wherein the opaque masking structures include an opaque layer directly on the porous inorganic layer.

5. The electronic device defined in claim 4 wherein the porous inorganic layer comprises a layer of porous titanium oxide.

6. The electronic device defined in claim 5 wherein the opaque layer comprises a layer of zirconium oxide.

7. The electronic device defined in claim 4 wherein the opaque layer comprises an inorganic opaque layer.

8. The electronic device defined in claim 7 wherein the transparent member comprises a button member.

9. The electronic device defined in claim 8 further comprising:
   a display, wherein the display has a display cover layer with an opening and wherein the button member is located in the opening.

10. The electronic device defined in claim 9 further comprising a sensor that is attached to the opaque layer.

11. The electronic device defined in claim 10 wherein the sensor is a fingerprint sensor.

12. Apparatus, comprising:
    a transparent member;
    an inorganic white opaque masking layer on the transparent member, wherein the inorganic white opaque masking layer includes a porous oxidized metal layer directly on the transparent member and a metal oxide layer directly on the oxidized metal layer; and
    a sensor coupled to the inorganic white opaque masking layer.

13. The apparatus defined in claim 12 wherein the porous oxidized metal layer is a porous white layer and the metal oxide layer is an opaque layer.

14. The apparatus defined in claim 13 further comprising a display cover layer with an opening, wherein the transparent member comprises a button member in the opening.

* * * * *